United States Patent
Brown

[15] 3,697,572
[45] Oct. 10, 1972

[54] N-ARYL-N'ALKYL-N'ARYLTHIO UREAS AS HERBICIDES

[72] Inventor: Melancthon S. Brown, Berkeley, Calif.

[73] Assignee: Chevron Research Company, San Francisco, Calif.

[22] Filed: May 28, 1970

[21] Appl. No.: 41,603

Related U.S. Application Data

[63] Continuation-in-part of Ser. No. 709,896, Mar. 4, 1968, abandoned, and a continuation-in-part of Ser. No. 3,238, Jan. 15, 1970, abandoned, which is a continuation-in-part of Ser. No. 709,896.

[52] U.S. Cl. .................................260/453 R, 71/98
[51] Int. Cl. ..............................................C07c 119/00
[58] Field of Search................260/453 R; 71/98, 120

[56] References Cited

UNITED STATES PATENTS

| | | |
|---|---|---|
| 3,332,975 | 7/1967 | Bauer et al. ...............260/453 |
| 3,165,549 | 1/1965 | Martin et al. ................71/120 |
| 3,497,541 | 2/1970 | Martin et al. ................71/120 |
| 3,276,855 | 10/1966 | Richter..........................71/98 |
| 2,655,445 | 10/1953 | Todd ............................71/120 |
| 3,309,192 | 3/1967 | Luckenbaugh...............71/120 |

FOREIGN PATENTS OR APPLICATIONS 965,512   7/1964   Great Britain.........260/453 R

*Primary Examiner*—Lewis Gotts
*Assistant Examiner*—G. Hollrah
*Attorney*—J. A. Buchanan, Jr., G. F. Magdeburger, John Stoner, Jr. and Raymond Owyang

[57] ABSTRACT

Ureas of the formula:

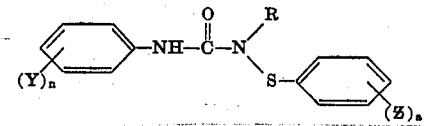

where R is alkyl of one to four carbon atoms, Y is halogen of atomic number 9 to 35, i.e., F, Cl and Br, alkyl of one to four carbon atoms, alkoxy of one to four carbon atoms or trifluoromethyl, with the proviso that when Y is alkyl or alkoxy, Y is in position 2, 4 or 6 of the nucleus, $n$ is 0 or an integer in the range of 1 and 3 inclusive with the proviso that when $n$ is 2 or 3 at least one Y is halogen, 8 is halogen of atomic number 9 to 35 or alkyl of one to about four carbon atoms and $a$ is 0, an integer in the range of 1 and 5 inclusive when Z is halogen, or 1 when Z is alkyl. These ureas are herbicidal.

9 Claims, No Drawings

N-ARYL-N'ALKYL-N'ARYLTHIO UREAS AS HERBICIDES

CROSS REFERENCE TO RELATED APPLICATIONS

This application is a continuation-in-part of copending application Ser. No. 709,896, filed Mar. 4, 1968 now abandoned, and a continuation-in-part of copending application Ser. No. 3,238, filed Jan. 15, 1970 now abandoned. Application Ser. No. 3,238 is a continuation-in-part of application Ser. No. 709,896.

FIELD OF INVENTION

This invention concerns a novel group of aromatic ureas and their use as herbicides. More particularly it concerns N-aryl-N'-alkyl-N'-arylthio ureas and their use as herbicides.

INVENTION DESCRIPTION

The herbicidal ureas of this invention may be represented by the formula:

(1)
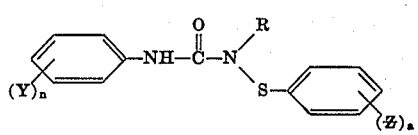

where R is alkyl of one to about four carbon atoms, Y is halogen of atomic number 9 to 35, i.e., F, Cl and Br, alkyl of one to about four carbon atoms, alkoxy of one to about four carbon atoms or trifluoromethyl, with the proviso that when Y is alkyl or alkoxy, it is in position 2, 4 or 6 of the nucleus, $n$ is 0 or an integer in the range of 1 and 3 inclusive with the proviso that when $n$ is 2 or 3 at least one Y is halogen, Z is halogen of atomic number 9 to 35 or alkyl of one to about four carbon atoms and $a$ is 0, an integer in the range of 1 and 5 inclusive when Z is halogen, or 1 when Z is alkyl. The Y's and Z's wherein $n$ and $a$ are integers greater than 1 may be the same or different.

Because of their exceptional herbicidal activities the compounds wherein R is methyl, $a$ is 1, Z is in position 4 of the benzene nucleus and is hydrogen, chlorine or alkyl of one to four carbon atoms and (a) when $n$ is 1, Y is fluorine in position 2 or chlorine in position 4 or (b) when $n$ is 2, one Y is chlorine in position 3 and the other Y is chlorine or bromine in position 4, are preferred. These preferred compounds may be represented by the formulas:

(2)
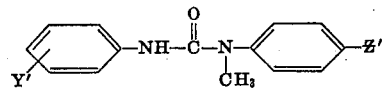

wherein Z' is Cl, hydrogen or alkyl of one to four carbon atoms and Y' is chlorine in position 4 or fluorine in position 2, and

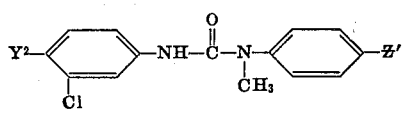

wherein Z' is as defined previously and $Y^2$ is Cl or Br. The compounds of formulas 2 and 3 wherein Z' is chlorine are particularly preferred.

Examples of ureas represented by formula (1) are: N-m-bromophenyl-N'-propyl-N'-p-bromophenylthio urea, N-o-fluorophenyl-N'-butyl-N'-p-chlorophenylthio urea, N-2,6-dichloro-4-methylphenyl-N'-methyl-N'-p-bromophenylthio urea, N-2-bromo-4-methoxyphenyl-N'-isopropyl-N'-4-ethylphenylthio urea, N-2,4,6-trichlorophenyl-N'-butyl-N'-2,5-dichlorophenylthio urea, N-2-methyl-3,4-difluorophenyl-N'-methyl-N'-p-fluorophenylthio urea, N-p-ethylphenyl-N'-methyl-N'-3,4-dibromophenylthio urea, N-p-cumyl-N'-n-butyl-N'-p-chlorophenylthio urea, N-p-butylphenyl-N'-methyl-N'-pentachlorophenylthio urea, N-o-ethoxyphenyl-N'-methyl-N'-tolylthio urea, N-p-butoxyphenyl-N'-ethyl-N'-p-chlorophenylthio urea, N-2,4,6-tribromophenyl-N'-propyl-N'-p-cumylthio urea, N-p-ethylphenyl-N'-butyl-N'-p-butylphenylthio urea, N-p-ethoxyphenyl-N'-ethyl-N'-2,4,6-trichlorophenylthio urea, N-2-chloro-4-butylphenyl-N'-methyl-N'-pentabromophenylthio urea, N-4-butoxy-2,6-difluorophenyl-N'-methyl-N'-3,4-difluorophenylthio urea and N-p-methoxyphenyl-N'-propyl-N'-2,4,6-trifluorophenylthio urea.

The above described ureas may be prepared by reacting a urea with a sulfenyl halide according to the following equation:

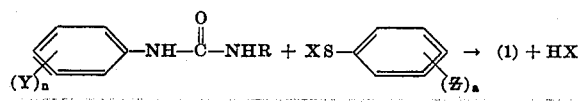

wherein X is halogen, preferably chlorine, and Y, R, Z, $n$ and $a$ are as previously defined. This reaction may be carried out in pyridine, dimethyl formamide with or without an acid acceptor or other solvents such as methylene chloride, chloroform, acetonitrile and dimethoxyethane using an acid acceptor. Acid acceptors which may be used with dimethyl formamide and these other solvents are pyridine, alkylpyridines, quinoline and similar heterocyclic bases. Pyridine is a preferred acid acceptor. When pyridine is used alone it acts both as a solvent and acid acceptor. The preferred medium for carrying out this reaction is dimethyl formamide with pyridine as an acid acceptor.

The pressures and temperatures at which the reaction is carried out are not critical. Since the reaction is slightly exothermic, temperatures ranging from ambient to about 60° C. will normally be used. However, lower temperatures or higher temperatures up to the decomposition temperature of the reactants and product may be used. For convenience the pressure will usually be atmospheric or autogenous. The reaction will normally be complete within 30 minutes to 4 hours.

The urea reactant in the above equation may be prepared in situ or beforehand. Conventional methods such as reacting an amine with an isocyanate may be used to prepare this reactant.

EXAMPLES

The following examples illustrate two methods which may be used to prepare the ureas of this invention. These examples are in no way intended to limit the invention described herein. Unless otherwise indicated, percentages are by weight.

Example 1

A mixture of 25 g. of N-p-chlorophenyl-N'-methyl urea in 200 g. of pyridine was placed in a vessel. 40 g. of p-chlorophenylsulfenyl chloride was added to this mixture. The combined mixture was stirred for one hour at ambient temperature. At the end of this time the mixture was added to a mixture of 200 g. of concentrated HCl in 1 liter of ice water. The organic materials in the mixture were extracted with 500 g. of methylene chloride. The extract was washed with dilute HCl, saturated NaHCO$_3$ solution and water, dried and stripped to an orange oil which crystallized slowly. This solid was recrystallized from a mixture of 50 ml. of benzene and 100 ml. of hexane. The recrystallized product was washed with 50 ml. of hexane to give 21.6 g. of N-p-chlorophenyl-N'-methyl-N'-p-chlorophenylthio urea. Its melting point was 94°–97° C.

Example 2

25 g. of N-p-chlorophenyl-N'-methyl urea, 100 g. dimethylformamide and 11.8 g. pyridine were mixed in a vessel at ambient temperature. 26.6 g. p-chlorophenylsulfenyl chloride was added to this mixture. The temperature of the mixture increased slightly during this addition, but it did not exceed 40° C. The combined mixture was then stirred at ambient temperature for 1 hour. After this time 1 liter of ice water was added to the mixture to form a solid percipitate. The mixture was filtered and the solid was washed with water and hexane and air dried. The dried solid weighed 39 g. Gas liquid chromographic analysis of this solid indicated it was essentially pure N-p-chlorophenyl-N'-methyl-N'-p-chlorophenylthio urea. This compound melted at 85°–96 C. and its sulfur and chlorine analyses were:

Calculated: S: 9.80%; Cl: 21.80%
Found: S: 9.99%; Cl: 21.35% this compound was purified by recrystallization from benzene and hexane. The purified compound melted at 95°–98 C.

Other ureas included within this invention were prepared using one or more of the methods described above. These compounds are listed in Table I.

TABLE I

| Compound | Element analyses | | | | Melting point, ° C. |
|---|---|---|---|---|---|
| | S | | Cl | | |
| | Calc. | Found | Calc. | Found | |
| N-2,5-dichlorophenyl-N'-methyl-N'-phenylthiourea | 9.78 | 9.76 | 21.65 | 21.62 | 59–61 |
| N-2,5-dichlorophenyl-N'-methyl-N'-p-chlorophenylthio urea | 8.86 | 9.21 | 29.45 | 28.82 | 125–128 |
| N-p-tolyl-N'-methyl-N'-phenylthio urea | 11.75 | 11.68 | 10.3 | 9.98 | 65–68 |
| N-p-tolyl-N'-methyl-N'-p-chlorophenylthio urea | 10.4 | 10.68 | 11.57 | 12.25 | 72–75 |
| N-m-chlorophenyl-N'-methyl-N'-phenylthio urea | 10.9 | 10.95 | 12.1 | 12.25 | 64–67 |
| N-p-methoxyphenyl-N'-methyl-N'-phenylthio urea | 11.10 | 11.08 | | | 53–55.5 |
| N-p-methoxyphenyl-N'-methyl-N'-p-chlorophenylthio urea | 9.92 | 10.18 | 11.00 | 11.42 | 85–87 |
| N-3,4-dichlorophenyl-N'-phenylthio urea | 9.78 | 9.92 | 21.7 | 21.72 | 102–105 |
| N-3,4-dicholorphenyl-N'-ethyl-N'phenylthio urea | 9.39 | 9.52 | 20.8 | 20.32 | 51.5–55 |
| N-p-chlorophenyl-N'-methyl-N'-phenylthio urea | 10.85 | 10.92 | 12.1 | 11.72 | 74–78 |
| N-3,4-dichlorophenyl-N'-ethyl-N'-p-chlorophenylthio urea | 8.51 | 8.57 | 28.2 | 27.65 | 85–86.5 |
| N-m-chlorophenyl-N'-methyl-N'-p-tolylthio urea | 10.4 | 10.13 | 11.6 | 12.32 | 66–69 |
| N-phenyl-N'-methyl-N'-p-chlorophenylthio urea | 10.9 | 10.77 | 12.1 | 12.30 | 65–70 |
| N-p-chlorophenyl-N'-ethyl-N'-p-chlorophenylthio urea | 9.4 | 9.80 | 20.8 | 21.62 | 61–64 |
| N-phenyl-N'-methyl-N'-p-tolylthio urea | 11.73 | 11.52 | 10.26 | 10.52 | 70–73 |
| N-o-chlorophenyl-N'-methyl-N'-p-chlorophenylthio urea | 9.80 | 10.13 | 21.65 | 21.68 | 79–83 |
| N-3,4-dichlorophenyl-N'-methyl-N'-p-tolylthio urea | 9.38 | 9.23 | 20.8 | 20.52 | 95–97 |
| N-p-chlorophenyl-N'-methyl-N'-p-tolythio urea | 10.4 | 10.62 | 11.55 | 11.78 | 101–103 |
| N-m-chlorophenyl-N'-methyl-N'-p-chlorophenylthio urea | 9.80 | 9.81 | 21.65 | 21.82 | 68–71 |
| N-3,4-dichlorophenyl-N'-methyl-N'-p-chlorophenylthio urea | 8.86 | 8.86 | 29.45 | 29.50 | 100–102 |
| N-phenyl-N'-methyl-N'-phenylthio urea | 12.3 | 12.1 | | | 59–63 |
| N-p-bromophenyl-N'-methyl-N'-phenylthio urea | 9.5 | 9.51 | | | 97–102 |
| N-p-bromophenyl-N'-methyl-N'-p-chlorophenylthio urea | 8.61 | 8.43 | | | 108–111 |
| N-3,4-dichlorophenyl-N'-methyl-N'-pentachlorophenylthio urea | 6.41 | 6.11 | 49.8 | 49.3 | 159–162 |
| N-3,5-dichlorophenyl-N'-methyl-N'-phenylthio urea | 9.79 | 9.82 | 21.65 | 21.75 | 130–132 |
| N-methyl-N-phenylthio-N'-o-fluorophenyl urea | 11.59 | 11.41 | *10.02 | *10.12 | 48–51 |
| N-m-trifluoromethylphenyl-N'-methyl-N'-p-chlorophenylthio urea | 8.87 | 8.77 | 9.85 | 9.93 | 97–100 |
| N-m-trifluoromethylphenyl-N'-methyl-N'-p-tolylthio urea | 9.42 | 10.52 | *8.24 | *7.46 | oil |
| N-o-fluorophenyl-N'-methyl-N'-p-tert.butylphenylthio urea | 9.63 | 9.71 | *8.42 | *8.50 | 85–88 |
| N-o-tolyl-N'-methyl-N'-p-chlorophenylthio urea | 10.42 | 10.47 | 11.56 | 11.88 | 77–83 |
| N-o-trifluoromethylphenyl-N'-methyl-N'-p-chlorophenylthio urea | 8.87 | 9.11 | 9.83 | 10.09 | oil |
| N-3,5-dichlorophenyl-N'-methyl-N'-p-chlorophenylthio urea | 8.85 | 9.05 | 29.3 | 29.85 | 134–137 |
| N-o-fluorophenyl-N'-methyl-N'-p-chlorophenylthio urea | 10.30 | 10.48 | 11.42 | 11.62 | 90–93 |
| N-p-fluorophenyl-N'-methyl-N'-p-chlorophenylthio urea | 10.30 | 9.95 | 11.42 | 11.50 | 87–92 |
| N-m-fluorophenyl-N'-methyl-N'-p-chlorophenylthio urea | 10.30 | 10.05 | 11.42 | 11.18 | 73–77 |
| N-2,4-difluorophenyl-N'-methyl-N'-p-chlorophenylthio urea | 9.73 | 10.12 | 10.79 | 11.48 | 66–70 |
| N-2-fluoro-5-trifluoromethylphenyl-N'-methyl-N'-p-chlorophenylthio urea | 8.45 | 8.47 | 9.36 | 9.63 | 102–106 |
| N-3-chloro-4-bromophenyl-N'-methly-N'-p-chlorophenylthio urea | 7.88 | 7.95 | **7.39 | **7.48 | 94–98 |
| N-3-fluoro-4-bromophenyl-N'-methyl-N'-p-chlorophenylthio urea | 8.21 | 8.11 | **5.13 | **5.26 | 103–106 |
| N-o-fluorophenyl-N'-methyl-N'-p-tolylthio urea | 11.02 | 10.77 | *9.64 | *9.61 | 74–78 |
| N-2-fluoro-4-bromophenyl-N'-methyl-N'-p-chlorophenylthio urea | 8.21 | 8.41 | **5.13 | **5.16 | 77–81 |
| N-2-fluoro-4-chlorophenyl-N'-methyl-N'-p-chlorophenylthio urea | 9.28 | 9.10 | 20.55 | 20.20 | 74–77 |
| N-3-fluoro-4-chlorophenyl-N'-methyl-N'-p-chlorophenylthio urea | 9.28 | 9.20 | 20.55 | 20.92 | 119–122 |

*Nitrogen rather than chlorine.
**Chlorine and bromine in meq./g.

UTILITY

The ureas of this invention are, in general, herbicidal in both pre- and post-emergence applications. For preemergence control of undesirable vegetation these ureas will be applied in herbicidal quantities to the environment, e.g., soil infested with seeds and/or seedlings of such vegetation. Such application will inhibit the growth of or kill the seeds, germinating seeds and seedlings. They are applied directly to the foliage and other plant parts in post-emergence applications. Generally they are effective against weed grasses as well as broadleaved weeds. Some may be selective with respect to type of application and/or type of weed.

Pre- and post-emergence herbicidal tests on representative ureas of this invention were made using the following methods:

Pre-Emergence Test

An acetone solution of the test urea was prepared by mixing 750 mg. urea, 220 mg. surfactant and 5 ml. acetone. This solution was added to c.a. 125 ml. water containing 156 mg. surfactant.

Seeds of the test vegetation were planted in a pot of soil and the urea solution was sprayed uniformly onto the soil surface at a dose of 200 micrograms per cm$^2$. The pot was watered and placed in a greenhouse. The pot was watered intermittently and observed for seedling emergence, health of emerging seedlings, etc., for a 3-week period. At the end of this period the herbicidal effectiveness of the urea was rated based on the physiological observations. A 0 to 100 scale was used; 0 representing no phytotoxicity, 100 representing complete kill.

Post-Emergence Test

The test urea was formulated in the same manner as described above for the Pre-Emergence Test. The concentration of urea in this formulation was 5,000 ppm. This formulation was uniformly sprayed on 2 replicate pots of 24-day-old test plants (c.a. 15–25 plants per pot) at a dose of 100 micrograms/cm$^2$. After the plants had dried, they were placed in a greenhouse. The plants were watered intermittently at their bases as needed and observed periodically for phytotoxic effects and physiological and morphological responses to the treatment. After 3 weeks, the herbicidal effectiveness of the urea was rated based on these observations. A 0 to 100 scale was used; 0 representing no phytotoxicity, 100 representing complete kill.

The results of these tests appear in Table II. For comparison the structurally related compounds, N-p-chlorophenylthio-N'-p-chlorophenyl urea, N,N'-dimethyl-N-p-chlorophenylthio urea and N-methyl-N'-p-chlorophenylthio urea, were also tested by the above described methods. These test results also appear in Table II.

TABLE II

| Compound | Herbicidal effectiveness, pre/post | | | | | | |
|---|---|---|---|---|---|---|---|
| | O | R | C | W | M | P | L |
| N-2,5-dichlorophenyl-N'-methyl-N'-phenylthio urea | 96/96 | 100/100 | 100/100 | 100/100 | 100/100 | 100/100 | 100/100 |
| N-p-tolyl-N'-methyl-N'-phenylthio urea | 100/100 | 100/100 | 100/100 | 100/100 | 100/100 | 100/100 | 100/100 |
| N-p-tolyl-N'-methyl-N'-p-chlorophenylthio urea | 100/100 | 100/100 | 100/100 | 100/100 | 100/100 | 100/100 | 100/100 |
| N-m-chlorophenyl-N'-methyl-N'-phenylthio urea | 100/100 | 100/100 | 100/100 | 100/100 | 100/100 | 100/100 | 100/100 |
| N-p-methoxyphenyl-N'-methyl-N'-phenylthio urea | 99/100 | 100/100 | 100/100 | 100/100 | 100/100 | 100/100 | 100/100 |
| N-p-methoxyphenyl-N'-methyl-N'-p-chlorophenylthio urea | 96/60 | 96/78 | 100/78 | 100/78 | 100/100 | 100/100 | 100/100 |
| N-3,4-dichlorophenyl-N'-methyl-N'-phenylthio urea* | 100/100 | 100/100 |  | 100/100 | 100/100 | 100/100 | 100/100 |
| N-3,4-dichlorophenyl-N'-ethyl-N'-phenylthio urea | 78/100 | 100/100 | 100/100 | 100/100 | 100/100 | 100/100 | 99/100 |
| N-p-chlorophenyl-N'-methyl-N'-phenylthio urea | 100/100 | 100/100 | 100/100 | 100/100 | 100/100 | 100/100 | 100/100 |
| N-m-chlorophenyl-N'-methyl-N'-p-tolylthio urea | 100/100 | 100/100 | 100/100 | 100/100 | 100/100 | 100/100 | 100/100 |
| N-phenyl-N'-p-chlorophenylthio-N'-methyl urea | 100/100 | 100/100 | 100/100 | 100/100 | 100/100 | 100/100 | 100/100 |
| N-p-chlorophenyl-N'-ethyl-N'-p-chlorophenylthio urea | 90/60 | 100/78 | 100/60 | 100/78 | 100/96 | 100/96 | 100/96 |
| N-phenyl-N'-methyl-N'-p-tolylthio urea | 100/100 | 100/100 | 100/100 | 100/100 | 100/100 | 100/100 | 100/100 |
| N-o-chlorophenyl-N'-methyl-N'-p-chlorophenylthio urea | 100/— | 100/— | 100/— | 100/— | 100/78 | 100/78 | 100/60 |
| N-3,4-dichlorophenyl-N'-methyl-N'-p-tolylthio urea | 100/100 | 100/100 | 100/100 | 100/100 | 100/100 | 100/100 | 100/100 |
| N-p-chlorophenyl-N'-methyl-N'-p-tolylthio urea | 96/100 | 96/100 | 78/60 | 90/96 | 100/100 | 100/100 | 100/100 |
| N-m-chlorophenyl-N'-p-chlorophenylthio-N'-methyl uear | 100/100 | 100/100 | 100/100 | 100/100 | 100/100 | 100/100 | 100/100 |
| N-3,4-dichlorophenyl-N'-p-chlorophenylthio-N'-methyl urea | 100/100 | 100/100 | 100/100 | 100/100 | 100/100 | 100/100 | 100/100 |
| N-phenyl-N'-methyl-N'-phenylthio urea | 100/100 | 100/100 | 100/100 | 100/100 | 100/100 | 100/100 | 100/100 |
| N-3,4-dichlorophenyl-N'-methyl-N'-pentachlorophenylthio urea | 100/100 | 100/100 | 100/100 | 100/100 | 100/100 | 100/100 | 100/100 |
| N-p-bromophenyl-N'-methyl-N'-phenylthio urea | 100/100 | 100/100 | 100/100 | 100/100 | 100/100 | 100/100 | 100/100 |
| N-p-bromophenyl-N'-methyl-N'-p-chlorophenylthio urea | 100/100 | 100/100 | —/100 | 100/100 | 100/100 | 100/100 | 100/100 |
| N-3,5-dichlorophenyl-N'-methyl-N'-phenylthio urea ** | 100/90 | 100/90 | —/100 | 100/100 | 100/100 | 100/100 | 100/100 |
| N-methyl-N'-phenylthio-N'-o-fluorophenyl urea |  |  |  |  | 100/— | 100/— | 100/— |
| N-m-trifluoromethylphenyl-N'-methyl-N'-p-chlorophenylthio urea | 100/100 |  | 100/100 | 100/100 | 100/100 | 100/100 | 85/100 |
| N-m-trifluoromethylphenyl-N'-methyl-N'-p-tolylthio urea | 90/100 |  |  | 100/100 | 100/100 | 100/100 | 100/100 |
| N-o-fluorophenyl-N'-methyl-N'-p-tert. butylphenylthio urea | 100/100 |  | 100/100 | 100/100 | 100/100 | 100/100 | 100/100 |
| N-o-tolyl-N'-methyl-N'-p-chlorophenylthio urea | 98/100 |  | 100/100 | 100/100 | 100/100 | 100/100 | 90/100 |
| N-o-trifluoromethylphenyl-N'-methyl-N'-p-chlorophenylthio urea *** | 39/78 |  | 60/96 | 90/60 | 100/100 | 100/100 | 100/100 |
| N-3,5-dichlorophenyl-N'-methyl-N'-p-chlorophenylthio urea | —/96 |  | —/96 | —/96 | —/100 | —/100 | —/100 |
| N-o-fluorophenyl-N'-methyl-N'-p-chlorophenylthio urea |  |  |  |  | 100/90 | 100/60 | 100/90 |
| N-p-fluorophenyl-N'-methyl-N'-p-chlorophenylthio urea | 100/100 |  | 100/100 | 100/100 | 100/100 | 100/100 | 100/100 |
| N-m-fluorophenyl-N'-methyl-N'-p-chlorophenylthio urea | 100/100 |  | 100/100 | 100/100 | 100/100 | 100/100 | 100/100 |
| N-2,4-difluorophenyl-N'-methyl-N'-p-chlorophenylthio urea | 100/100 |  | 100/)00 | 100/100 | 100/100 | 100/100 | 100/100 |
| N-2-fluoro-5-trifluoromethylphenyl-N'-methyl-N'-p-chlorophenylthio urea | 100/100 |  | 100/100 | 100/100 | 100/100 | 100/100 | 100/100 |
| N-3-chloro-4-bromophenyl-N'-methyl-N'-p-chlorophenylthio urea | 100/100 |  | 100/100 | 100/100 | 100/100 | 100/100 | 100/100 |
| N-3-fluoro-4-bromophenyl-N'-methyl-N'-p-chlorophenylthio urea | 90/100 |  | 100/100 | 98/100 | 100/100 | 100/100 | 100/100 |
| N-2-fluoro-4-bromophenyl-N'-methyl-N'-p-chlorophenylthio urea | 90/100 |  | 100/90 | 100/100 | 100/100 | 100/100 | 100/100 |
| N-2-fluoro-4-chlorophenyl-N'-methyl-N'-p-chlorophenylthio urea | 100/— |  | 100/100 | 100/100 | 100/100 | 100/100 | 93/100 |
| | 100/100 |  | 100/100 | 100/100 | 100/100 | 100/100 | 100/100 |

| | Comparison tests | | | | | | |
|---|---|---|---|---|---|---|---|
| N-p-chlorophenylthio-N'-p-chlorophenyl urea | 0/0 | 0/0 | 0/0 | 0/0 | 0/0 | 0/0 | 0/0 |
| N-N'-dimethyl-N-p-chlorophenylthio urea | 0/0 | 0/0 | 0/0 | 0/0 | 0/3 | 0/3 | 0/3 |
| N-methyl-N'-p-chlorophenylthio urea | 0/0 | 0/0 | 0/0 | 0/0 | 0/0 | 0/0 | 0/0 |

\* Concentration was 100 micrograms/cm.$^2$ in pre-emergence test.
\*\* Active in pre-emergence application only on broadleaf weeds.
\*\*\* Effective only in post-emergence application.
O = Wild oats (*Avena fatua*).
R = Annual ryegrass (*Lolium multiflorum*).
C = Crabgrass (*Digitaria sanguinalis*).
W = Watergrass (*Echinochloa crusgalli*).
M = Mustard (*Brassica arvensis*).
P = Pigweed (*Amaranthus retroflexus*).
L = Lambsquarter (*Chenopodium album*).

The exceptional post-emergence herbicidal activity of the ureas of formulas 2 and 3 above is illustrated by the data appearing in Table III below. These data were developed using the Post-Emergence Test described above but with the indicated dosages.

One of the preferred compounds, N-3-bromo-4-chlorophenyl-N'-methyl-N'-p-chlorophenylthio urea, showed remarkable selectivity between broadleaves and grasses in post-emergence application. For instance, at a dosage level of 3.7 micrograms/cm² this

TABLE III

Post-emergence activity—preferred compounds v. analogs

| Compounds | Conc., mcg./cm.² | O* | R* | W* | L* | P* | M* |
|---|---|---|---|---|---|---|---|
| N-p-chlorophenyl-N'-methyl-N'-p-chlorophenylthio urea | 11 | 100 | 100 | 92 | 100 | 100 | 100 |
|  | 3.7 | 53 | 13 | 58 | 100 | 100 | 100 |
|  | 1.2 |  |  |  | 83 | 100 | 100 |
| N-p-chlorophenyl-N'-methyl-N'-p-tolylthio urea | 11 | 100 | 100 | 100 | 100 | 100 | 100 |
|  | 3.7 | 57 | 58 | 75 | 100 | 100 | 100 |
|  | 1.2 |  |  |  | 27 | 50 | 50 |
| N-3,4-dichlorophenyl-N'-methyl-N'-phenylthio urea | 11 | 76.7 | 100 | 100 | 100 | 100 | 100 |
|  | 3.7 | 38.3 | 71.7 | 85 | 100 | 100 | 100 |
|  | 1.2 |  |  |  | 98 |  | 100 |
| N-3,4-dichlorophenyl-N'-methyl-N'-p-tolylthio urea | 11 | 100 | 92 | 100 | 100 | 100 | 100 |
|  | 3.7 | 70 | 35 | 50 | 100 | 100 | 100 |
|  | 1.2 |  |  |  | 100 | 100 | 100 |
| N-3,4-dichlorophenyl-N'-methyl-N'-p-chlorophenylthio urea | 11 | 62 | 100 | 100 | 100 | 100 | 100 |
|  | 3.7 | 3 | 72 | 65 | 100 | 100 | 100 |
|  | 1.2 |  |  |  |  |  |  |
| N-o-fluorophenyl-N'-methyl-N'-p-chlorophenylthio urea | 11 | 100 |  | 100 | 100 | 100 | 100 |
|  | 3.7 | 90 |  | 62 | 100 | 100 | 100 |
|  | 1.2 |  |  |  | 100 | 83 | 100 |
| Analogs | | | | | | | |
| N-phenyl-N'-methyl-N'-p-tolylthio urea | 11 | 95 | 97 | 92 | 100 | 100 | 100 |
|  | 3.7 | 17 | 17 | 33 | 100 | 100 | 100 |
|  | 1.2 |  |  |  | 7 | 33 | 55 |
| N-phenyl-N'-methyl-N'-p-chlorophenylthio urea | 11 | 100 | 97 | 95 | 100 | 100 | 100 |
|  | 3.7 | 27 | 32 | 37 | 100 | 87 | 100 |
|  | 1.2 |  |  | 22 | 17 | 3 | 50 |
| N-m-chlorophenyl-N'-methyl-N'-p-chlorophenylthio urea | 11 | 87 | 100 | 0 | 97 | 20 | 100 |
|  | 3.7 | 0 | 0 | 0 | 0 | 0 | 97 |
| N-3,5-dichlorophenyl-N'-methyl-N'-p-chlorophenylthio urea | 11 | 0 |  | 0 | 75 | 35 | 100 |
|  | 3.7 | 0 |  | 0 | 43 | 18 | 0 |
| N-p-fluorophenyl-N'-methyl-N'-p-chlorophenylthio urea | 11 | 40 |  | 33 | 90 | 60 | 98 |
|  | 3.7 | 40 |  | 10 | 75 | 55 | 73 |
| N-m-fluorophenyl-N'-methyl-N'-p-chlorophenylthio urea | 11 | 70 |  | 45 | 100 | 100 | 100 |
|  | 3.7 | 25 |  | 25 | 100 | 40 | 100 |

*See Table II.

As illustrated by the above data the preferred compounds generally exhibit better post-emergence activity than their analogs in which the N-phenyl group is either unsubstituted or substituted in different positions. Two other analogs, N-m-chlorophenyl-N'-methyl-N'-p-chlorophenylthio urea and N-2,5-dichlorophenyl-N'-methyl-N'-p-chlorophenylthio urea, were less active than the preferred compounds at 200 micrograms/cm² compound was completely inactive against grasses but provided 97%, 100% and 97% control of lambsquarter, pigweed and mustard, respectively. On this basis, the N-3-bromo-4-chlorophenyl compounds are included in the preferred subgenus of formula 3 above.

The preferred compounds of formula 1 above in which Y' is fluorine in position 2 are also generally better than their analogs in pre-emergence applications. This superiority is illustrated by the data in Table IV below.

TABLE IV

Pre-emergence activity—preferred compounds v. analogs

| Compound | Conc., mcg./cm.² | O* | W* | L* | P* | M* |
|---|---|---|---|---|---|---|
| N-o-fluorophenyl-N'-methyl-N'-p-chlorophenylthio urea | 11 | 100 | 100 | 97 | 100 | 100 |
|  | 3.7 | 95 | 100 | 98 | 100 | 100 |
|  | 1.2 |  |  |  | 100 | 95 |
| N-methyl-N-phenylthio-N'-o-fluorophenyl urea | 11 | 100 | 100 | 93 | 100 | 99 |
|  | 3.7 | 100 | 97 | 87 | 100 | 99 |
| Analogs | | | | | | |
| N-phenyl-N'-p-chlorophenylthio-N'-methyl urea | 11 | 97 | 85 | 87 | 100 | 100 |
|  | 3.7 | 57 | 40 | 55 | 100 | 100 |
|  | 1.2 |  |  |  | 95 | 50 |
| N-m-fluorophenyl-N'-methyl-N'-p-chlorophenylthio urea | 11 | 100 | 90 | 89 | 100 | 100 |
|  | 3.7 | 50 | 33 | 40 | 77 | 88 |
|  | 1.2 |  |  |  |  |  |

TABLE IV — Continued

Pre-emergence activity—preferred compounds v. analogs

| | | | | | | |
|---|---|---|---|---|---|---|
| N-p-fluorophenyl-N'-p-chlorophenylthio urea | 11 | 97 | 98 | 97 | 100 | 100 |
| | 3.7 | 40 | 93 | 83 | 97 | 93 |
| N-o-chlorophenyl-N'-methyl-N'-p-chlorophenylthio urea | 11 | 7 | 7 | 50 | 37 | 45 |
| | 3.7 | 0 | 0 | 7 | 0 | 8 |
| N-phenyl-N'-methyl-N'-phenylthio urea | 11 | 100 | 98 | 92 | 100 | 100 |
| | 3.7 | 80 | 68 | 85 | 100 | 100 |

*See Table II.

The data in Table IV show that said compounds of formula 2 are better pre-emergence herbicides than their analogs in which the N-phenyl group is unsubstituted, the position of the fluorine atom is changed or the fluorine atom is replaced with a chlorine atom.

The amount of urea administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 ppm. urea distributed throughout 0.1 acre-foot. For post-emergence application, such as foliar spray application, compositions containing about 0.5 to 8 lbs. urea per 100 gal. spray will be used. Such application is equivalent to about 0.5 to 20 lbs. urea per acre.

The herbicidal compositions of this invention comprise a herbicidal amount of one or more of the above described ureas intimately admixed with a biologically inert carrier. The carrier may be a liquid diluent such as water or acetone or a solid. The solid may be in the form of dust, powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

I claim:
1. Urea of the formula:

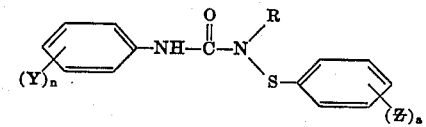

where R is alkyl of one to four carbon atoms, Y is halogen of atomic number 9 to 35, i.e., F, Cl and Br, alkyl of one to four carbon atoms, alkoxy of one to four carbon atoms or trifluoromethyl, with the proviso that when Y is alkyl or alkoxy, said alkyl or alkoxy is in position 2, 4 or 6 of the nucleus, $n$ is 0 or an integer in the range of 1 and 3 inclusive with the proviso that when $n$ is 2 or 3 at least one Y is halogen, Z is halogen of atomic number 9 to 35 or alkyl of one to four carbon atoms and $a$ is 0, an integer in the range of 1 and 5 inclusive when Z is halogen, or 1 when Z is alkyl.

2. The urea of claim 1 wherein R is methyl, $a$ is 1, Z is in position 4 of the benzene nucleus and is hydrogen, chlorine or alkyl of one to four carbon atoms and (a) $n$ is 1 and Y is fluorine in position 2 or chlorine in position 4 or (b) $n$ is 2 and one Y is chlorine in position 3 and the other Y is chlorine or bromine in position 4.

3. The urea of claim 2 wherein Z is in position 4 and is chlorine.

4. The urea of claim 1 wherein R is methyl, $a$ is 1, Z is chlorine in position 4, $n$ is 1 and Y is fluorine in position 2.

5. The urea of claim 1 wherein R is methyl, $a$ is 1, Z is in position 4 and is chlorine, $n$ is 2 and one Y is chlorine in position 3 and the other Y is chlorine in position 4.

6. The urea of claim 1 wherein R is methyl, $a$ is 1, Z is tert. butyl in position 4, $n$ is 1 and Y is fluorine in position 2.

7. The urea of claim 1 wherein R is methyl, $a$ is 0, $n$ is 2 and one Y is chlorine in position 4 and the other Y is chlorine in position 3.

8. The urea of claim 1 wherein R is methyl, $a$ is 0, $n$ is 1 and Y is fluorine in position 2.

9. The urea of claim 1 wherein R is methyl, $a$ is 1, Z is chlorine in position 4, $n$ is 2 and one Y is chlorine in position 3 and the other Y is bromine in position 4.

* * * * *